Figure 1:
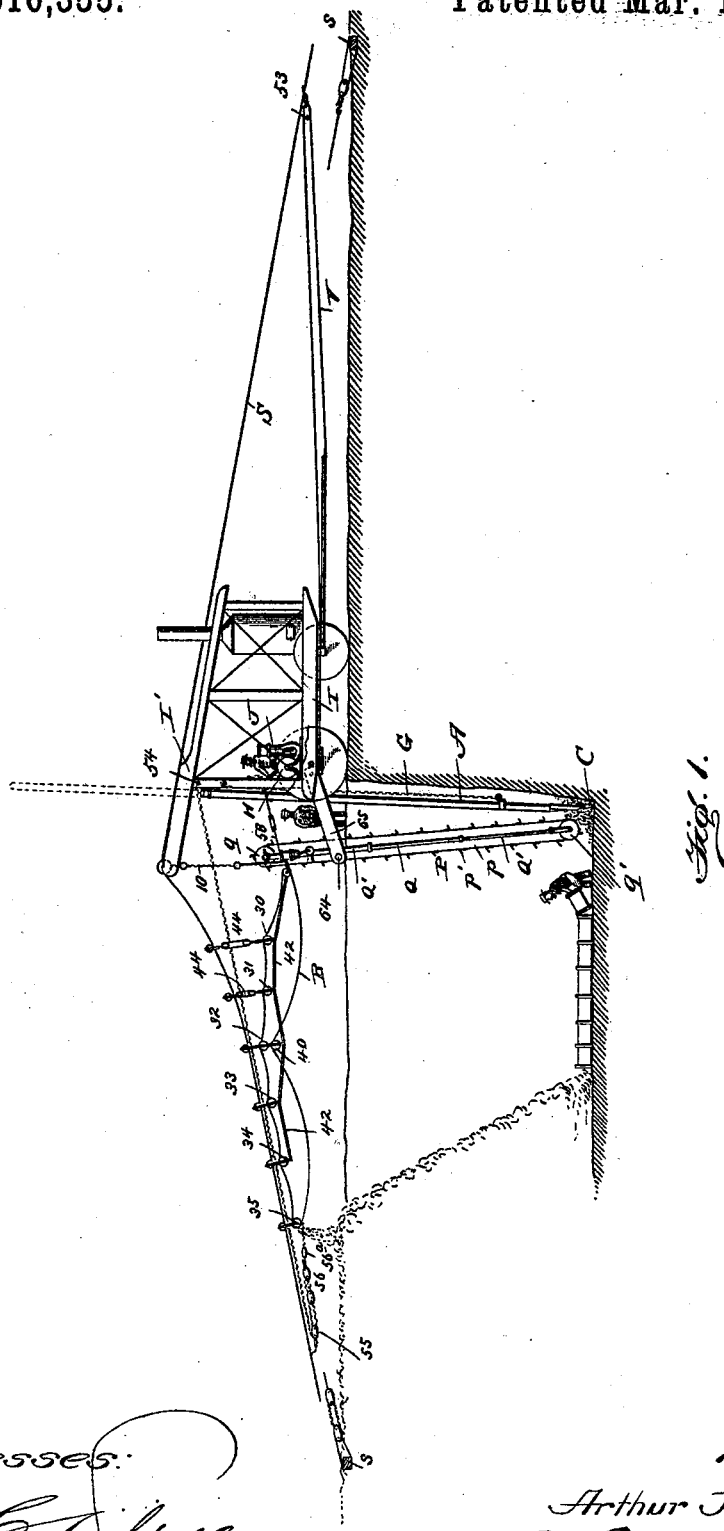

(No Model.) 4 Sheets—Sheet 1.

A. J. MASON.
MACHINE FOR EXCAVATING TRENCHES.

No. 516,355. Patented Mar. 13, 1894.

Witnesses:

Inventor:
Arthur J. Mason,
By Edson Bros
Att'ys.

(No Model.) 4 Sheets—Sheet 2.
A. J. MASON.
MACHINE FOR EXCAVATING TRENCHES.
No. 516,355. Patented Mar. 13, 1894.
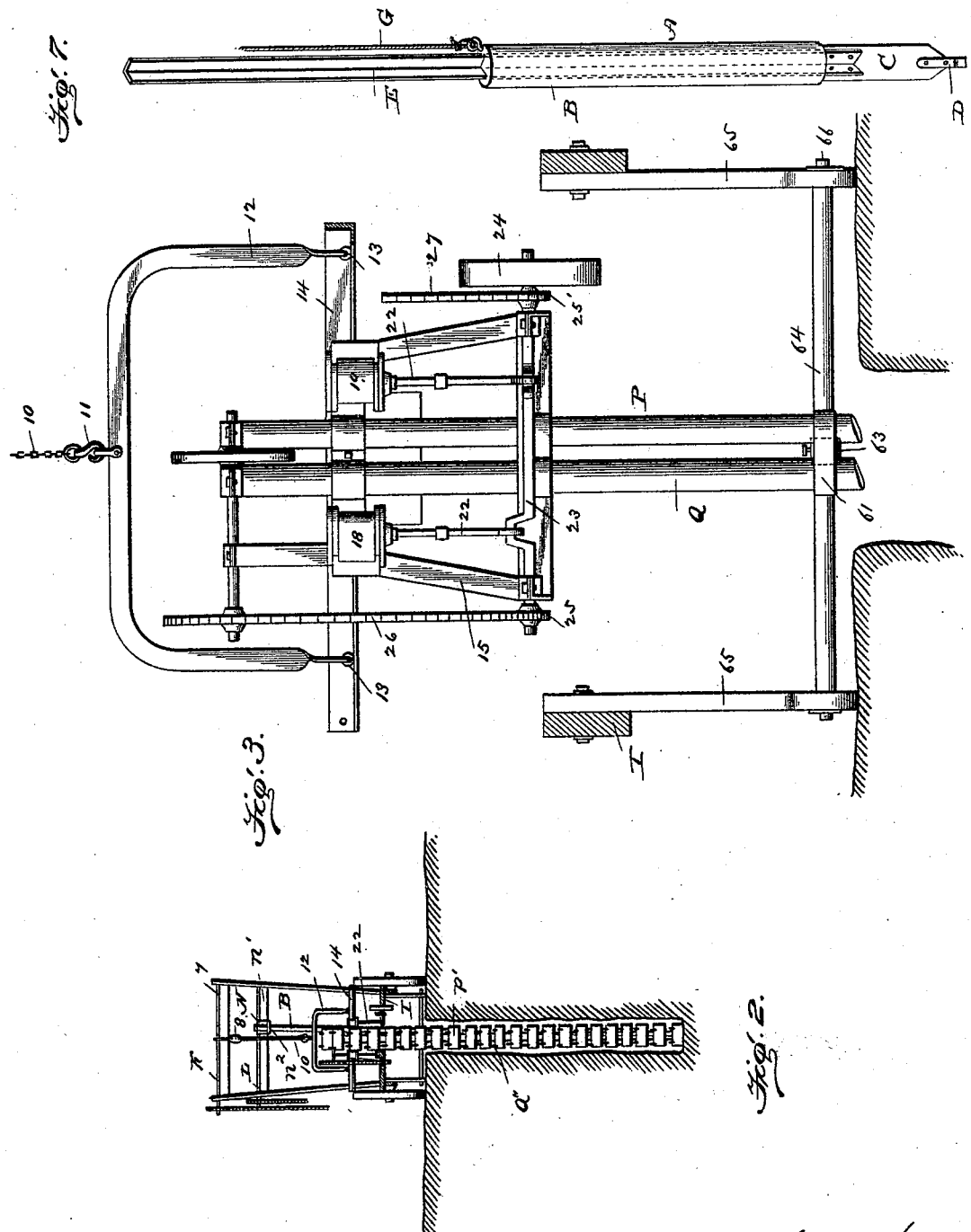
Witnesses:
Inventor:
Arthur J. Mason.
By Edson Bros
Attys.

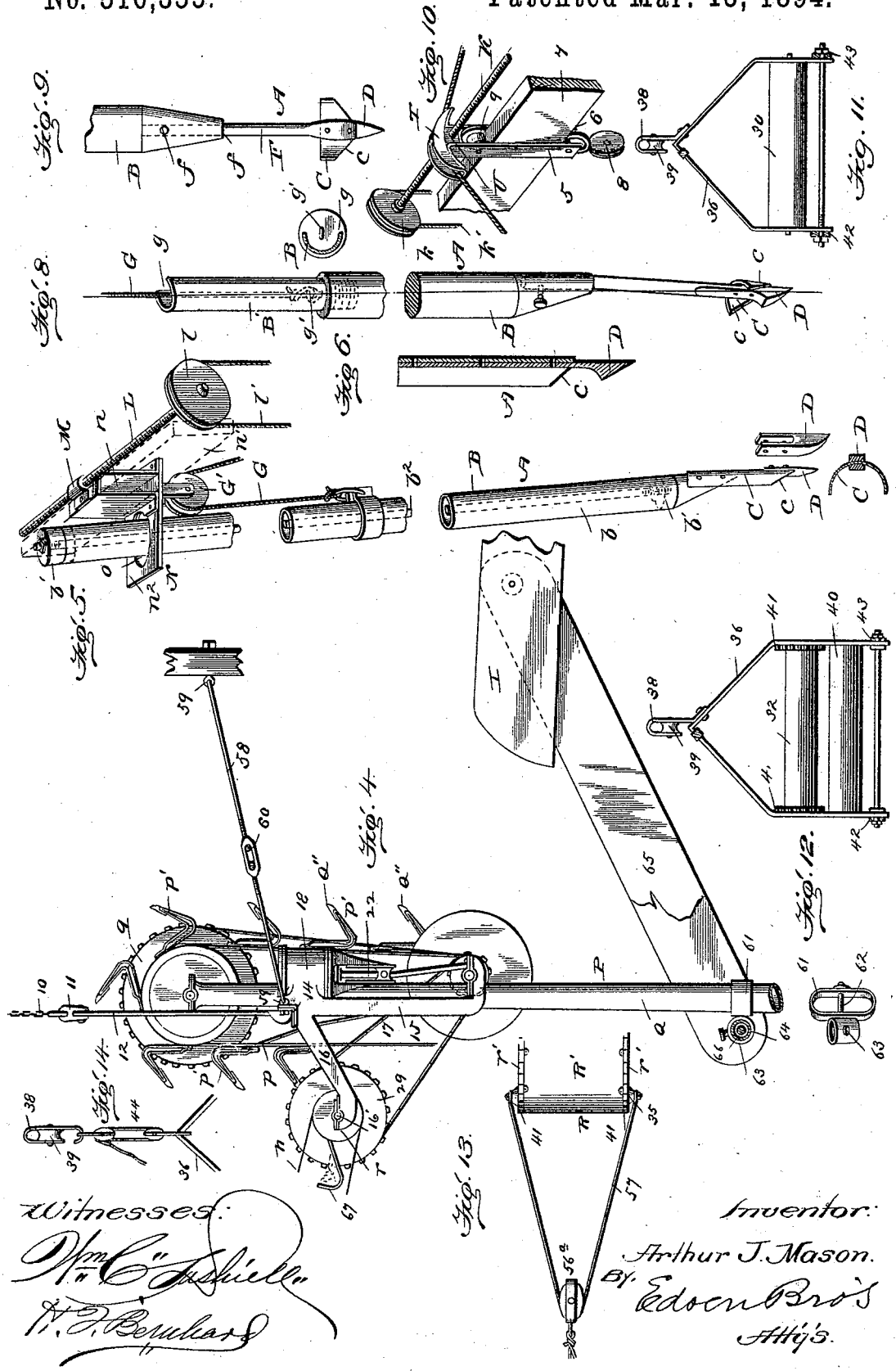

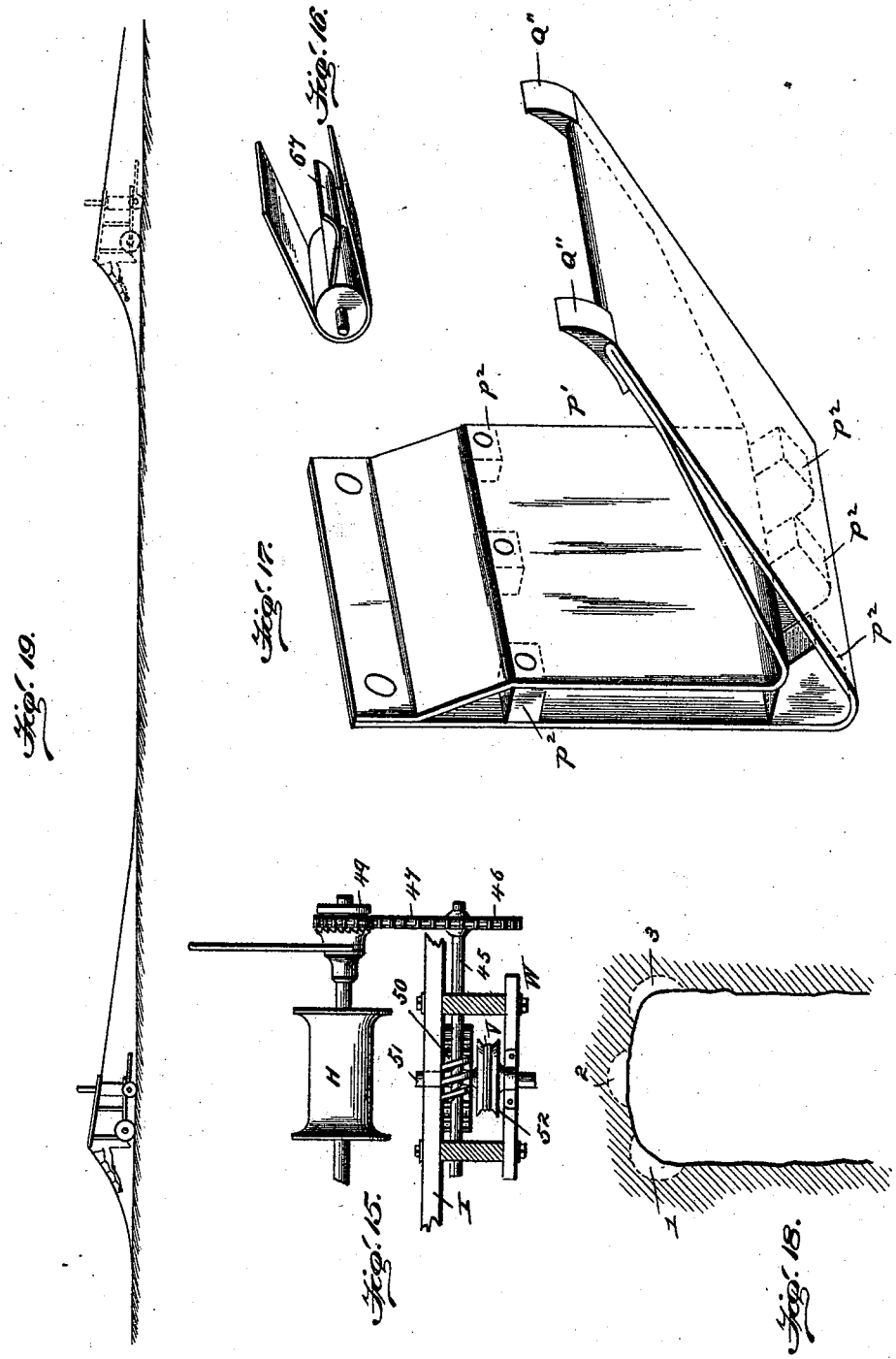

UNITED STATES PATENT OFFICE.

ARTHUR JOHN MASON, OF KANSAS CITY, MISSOURI.

MACHINE FOR EXCAVATING TRENCHES.

SPECIFICATION forming part of Letters Patent No. 516,355, dated March 13, 1894.

Application filed August 18, 1892. Serial No. 443,408. (No model.)

*To all whom it may concern:*

Be it known that I, ARTHUR JOHN MASON, a citizen of the United States, and a resident of Kansas City, in the county of Jackson and State of Missouri, have invented certain new and useful Improvements in Machines for Excavating Trenches; and I do hereby declare the following to be a full, clear, and exact description of the invention, such as will enable others skilled in the art to which it appertains to make and use the same.

The nature of this invention relates to a machine for excavating trenches designed for laying underground pipes, conduits, and for other purposes; and the primary object of the invention is to place the cutting mechanism under the direct or immediate control of the attendants, carry the excavated material back to the rear part of the trench to be utilized in refilling the same after the pipes, &c., have been laid, and to adapt the several parts of the apparatus so that the work of cutting, elevating and carrying the soil can be carried on continuously without regard to the state of the weather or the character of the soil operated upon.

The first part of the invention relates to a novel form of power cutting or plowing mechanism which is so suspended and guided that it is under the complete control of the attendant who is able to place the same in the most advantageous positions for cutting or paring off slices of soil; and this cutting mechanism has in addition to this highly important ease and precision of adjustment, the following characteristic features which experience has demonstrated are of value to secure successful operation under the conditions of practical work, to wit:—to cut or pare off slices of earth continuously from the top surface of the trench to the lowermost extremity or bottom line of the trench and thereby avoid the objection frequently met with of leaving an uncut rounded bottom to the trench which is liable to become compacted and made more solid under repeated blows of the cutter or plow; to loosen the earth at the bottom of the trench so it can be advantageously taken up by the elevating mechanism; to effect the cutting or paring of the earth without permitting the heavy weighted part of the cutter to come into contact with the face of the landside of the trench and thereby insure clearance for the mechanism that operates the cutter or plow; and to enable the cutter to penetrate stony or gravelly soil without undue strain on the parts, or liability to breakage of the cutter, or the cessation of the work owing to the failure of the cutter to properly perform its duties.

My invention further relates to the novel means whereby the apparatus can be made to adjust or accommodate itself to the surface slopes of the ground in which the trench is to be excavated and at the same time without impairing the efficiency of the several operating mechanisms employed for digging, raising and carrying off the soil; further, to the novel means for sustaining the weight of the elevating and carrying mechanisms whereby the hoisting and operating engine on the wheeled truck is adapted to at all times rest on the ground in advance of the trench and thus obviate the liability of the earth caving into the trench owing to the weight of the apparatus resting on the weaker part around the front or landside of the trench; further, to mechanism for moving the apparatus as the work of excavating the trench progresses and which serves to maintain the horizontal carrier belt in a taut condition at all times; further, to a novel arrangement of engine for operating the elevator and carrier mechanisms without reference to the positions which said mechanisms occupy to the main frame or the slope of the ground; further to a novel carrier which operates efficiently even in a high wind to carry away all the loosened earth lifted and deposited thereon by the elevator and which can be adjusted vertically to accommodate the lengthening of the elevator to a trench of maximum depth or the shortening of the elevator to a trench of minimum depth; further, to a novel means of adjusting the carrier mechanism by the attendant at the mouth of the trench to cause the same to lie in a line substantially at right angles to the vertical plane of the elevator in order to better adapt the carrier to perform its work. And finally the invention consists in the novel combinations of devices and construction and arrangement of parts which will be hereinafter more fully described and particularly pointed out in the claims.

The accompanying drawings, forming a part of this specification, fully illustrate my machine for digging trenches, in which—

Figure 1 is a view in side elevation of the apparatus in position for digging the trench, elevating the loosened earth, and carrying the same to the rear part of the trench for refilling the latter after the pipes or conduits are laid, the whole of the work being designed to be carried on continuously. Fig. 2 is an end view of the machine with the trench in cross section. Fig. 3 is a detail view in front elevation of the suspended yoke and frame which sustain the engine for driving the elevator and the horizontal carrier belt. Fig. 4 is a like view in side elevation of the same parts, showing also a portion of the elevator, carrier, and the means for adjusting the carrier to keep the same substantially at right angles to the elevator. Fig. 5 is a detail perspective view of one form of the cutter, and its guiding and adjusting mechanism. Fig. 6 is a detail perspective view of a modified construction of the cutter-blade and entering point adapted for use in the style of weighted cutter shank shown in Fig. 5. Fig. 7 is a perspective view of another form of cutting mechanism in which the blade and its guide bar are adapted to be forced into the ground under successive blows of a reciprocating weight that is guided on the bar to which the cutter blade is attached. Figs. 8 and 9 are detail views of another form of reciprocating cutter contemplated by my invention. Fig. 10 is a detail perspective of the means for guiding the suspension cable and for adjusting the elevator and carrier laterally across the machine. Figs. 11, 12, 13 and 14 are detached views of parts of the appliances for supporting the horizontal carrier belt. Fig. 15 is a detail view, partly in section and partly in elevation, of the friction drum for moving the apparatus forward as the work progresses. Fig. 16 is a detail view illustrating the scraper for keeping the driving roller of the carrier belt free from accumulations of dirt. Fig. 17 is a detail perspective view, on an enlarged scale, of one of the buckets of the elevator. Fig. 18 is a diagrammatic section of a part of the trench illustrating the method adopted by me of cutting the vertical front or landside of the trench, and Fig. 19 illustrates the method of arranging the suspension cable out of the way of traffic and of moving the apparatus along the line of and beneath said cable.

Like letters and numerals of reference denote corresponding parts in all the figures of the drawings.

In the practical operation of cutting a trench in the soil, I propose to slice off or pare the earth by spacing the series of cuts at suitable intervals apart indicated at 1, 2, 3, in Fig. 18 of the drawings, and then follow with another series of cuts intermediate between the first named series of cuts, this method of cutting the soil being followed throughout the operation of digging the trench. In order to successfully pursue this course, it is necessary to employ a cutting mechanism which is under the complete control of one of the attendants who is able to place or adjust the cutter with all the intelligence of a laborer using a hand pick or other tool. This cutting mechanism is capable of adjustment by the attendant within quite a wide radius, at least five (5) feet in my practical working apparatus, and with a cutting mechanism capable of such wide manual adjustment or manipulation is combined a power mechanism which imparts great energy to the cutting mechanism to enable it to successfully cut a trench of any desired depth, the maximum depth being approximately twenty (20) feet.

I am aware that mechanism can be employed to effect, automatically, the proper location and twist of each stroke of the cutter mechanism so that the engineer in charge of the hoisting mechanism can also adjust the cutter; but I prefer to have the cutter manually directed at each stroke by another man, for the following reasons:—The second attendant is in better position to direct each stroke of the cutter to the very best advantage, the engineer in control of the hoisting and hauling mechanisms is already sufficiently employed, with two men more frequent strokes of the cutting mechanism can be executed, and finally a second man is necessary to occasionally feed the furnace and attend to the boiler.

The cutter is represented at A in Figs. 1, 5, 6, 7, 8 and 9; and it consists of a heavily weighted shank or bar B; a cutter blade C, and an entering point D, all of substantial construction and united solidly together. In the cutting mechanism shown in Figs. 1 and 5, the shank or bar B consists of a long tube $b$ which is filled with a heavy substance to bring it up to the required weight, about six hundred pounds; the solid end pieces or caps $b'$, $b'$, and a longitudinal through bolt $b^2$ which passes through the tube and the end caps, suitable nuts being screwed on the threaded ends of the bolt to unite the parts together. The cutting blade C is made of a single thin piece of metal, having its lower end beveled to form the cutting edges $c$, and made or bent to uniform concavo-convex form in cross section. The upper end of this blade is solidly fastened to the prolonged lower part of the lower end cap $b'$ by through bolts or in any equivalent manner; and to this cutting blade is rigidly united the entering point D. This entering point is made of a single piece of metal, substantially square or of polygonal form in cross section, and forked at its upper end to enable its prongs to fit on opposite sides of the cutter blade and to be united solidly thereto by transverse bolts or equivalent fastenings. This entering point is arranged centrally in relation to the cutting blade C, and depends or extends below the lower extremity thereof; and the lower end of said entering point is beveled or pointed to adapt the same to easily penetrate the soil. The cutter being made very heavy, it is allowed to drop or fall by gravity and the blade serves to pare or cut off the soil in large slices from the vertical face at the landside of the trench; and during the operation of cutting the soil the entering point serves to guide the cutter blade clear of the stones and other obstructions in the path of the cutter, which is of very great advantage in cutting through stony or gravelly earth.

The tendency of the heavy weighted cutter is to fall or drop in a vertical line, and to enable the work to be properly performed without allowing the weighted shank B to strike against the vertical face of the trench and to secure the necessary free space between said shank and the face of the trench for the hoisting cable, I arrange the cutter blade at an angle to the line of the shank. The cutter blade lies in an oblique position to the length of the shank or bar, its inclination being approximately one inch (1") to the foot, and thus the cutter blade is adapted to be set into and plow its way through the soil while the weighted shank is kept from contact with the vertical face of the trench at the landside thereof.

A modified form of cutter blade and point is shown by Fig. 6 adapted for use in connection with the weighted shank of Figs. 1 and 5. This entering point D has its shank prolonged or extended along the length of the cutter blade, to which it is riveted; and the upper end of said prolonged shank is united to the lower end cap $b'$ along with the cutter blade while the lower end of said point depends below the lower edge 6 of the cutter blade.

In lieu of rigidly uniting the weighted shank and the cutter blade together and having the connected parts reciprocate or move together, I may have the weighted shank reciprocate on the long vertical bar that serves as the means for conveniently adjusting or placing the cutter blade to the desired place in the ground. This form of cutting mechanism in which the reciprocating weight is adapted to deliver a series of hammer-like blows to the cutter-blade, is more particularly designed for cutting through soils of considerable resistance; and in this embodiment of my invention which is illustrated by Fig. 7 the cutter blade is rigidly united, in an oblique position, to the lower end of a long vertical bar E which is of such length as to reach to the bottom of a trench of the maximum depth and to a sufficient distance above the ground to be conveniently grasped and adjusted by the attendant standing at the mouth of the trench. This cutter blade is provided with the entrance point, and the guide bar is made angular in cross section, preferably of a single piece having its flanges standing at right angles. The reciprocating weight has passages formed therein to receive said angular bar which serves to guide the weight as it reciprocates thereon; and this weight is adapted to strike directly upon the upper end of the cutter-blade to force the same through the soil.

In Figs. 8 and 9 another construction of the cutting mechanism is shown, in which the several parts are rigidly united together in the same general manner as the cutter illustrated in Figs. 1 and 5. The weighted shank B is cast or formed of a single piece of metal, and the cutter blade C and entrance point D are attached to the weighted shank by means of a stout steel bar F. The lower end of the weighted shank has a vertical central socket, $f$, which receives the upper end of the bar F that is fastened to the shank B by the transverse pin $f'$; and the entrance point D is made integral with the steel bar F by properly manipulating or shaping the lower part of said bar to the proper form of the entrance point. The cutter blade C is made of a thin piece of metal, bent into concavo-convex form in cross section, and having the lower beveled or cutting edges $c$; and this cutting blade is rigidly united to the bar F by transverse bolts or rivets or in any equivalent substantial way. The upper end of the weighted shank B is cut away on one side to provide the face or recess $g$, and in this upper end of the shank B is permanently fixed an eye $g'$ which is arranged in the line of the longitudinal axis of said shank B, the hoisting cable for the cutter being connected to this eye so that said cable is attached centrally to the weighted cutter.

The cutter blade in the construction shown in Figs. 8 and 9 is arranged obliquely to the line of the weighted shank by giving to the steel bar F the proper curved or bent shape, or fitting the same in an oblique socket in the cutter-shank, in order to cause the line of the cutter blade to lie obliquely or at an angle to the axis of the cutter shank, as will be readily understood by those skilled in the art. The upper end of the weighted shank B in this form of cutter has rigidly attached thereto the light angle piece $B'$ of uniform cross section which enables the operator to conveniently grasp and manipulate the cutter.

The method of attaching the cutter blade and the entrance point to the weighted shank disclosed by Figs. 6, 8 and 9, possesses practical advantages in that the parts are so united that most of the strain and shock are transmitted to and taken up by the weighted solid shank B of the cutter; thus securing the increased durability and longer service of the cutter blade and entrance point. The form of cutter shown in Figs. 8 and 9, is designed to secure the greatest penetrating power owing to the minimum area presented for friction by the narrow cutter blade and the small bar or shank. The shank of the cutting mechanism is of such length that it extends from the bottom of a trench of maximum depth to a convenient distance above the surface of the ground to be grasped by the attendant standing at the mouth of the trench; and this shank is made of uniform cross section throughout its length to enable the attendant to readily grasp the same at any point for the purpose of twisting or turning the cutter on its axis more or less according to the position in which it is desired to place the cutter. One of the important features of my cutting mechanism resides in this convenient method of twisting or turning the cutting mechanism so that the curved cutter blade can always be brought into position to face the open cut or trench, and in addition to this the cutting mechanism is capable of the wide range of adjustment hereinbefore referred to. Thus, the cutting mechanism can be placed on one side of the trench to make the cut indicated at 1 in Fig. 18, or on the other side of the trench to make the cut 3, or in the middle of the trench to make the cut 2; and in each instance the cutter shank is twisted or turned by the operator so that the concave side of the cut 1, 2 or 3, faces the open cut or part of the trench as clearly indicated by Fig. 18.

In order to extract and loosen the dirt at the bottom of the trench, I have found that the cutter blade requires an approximate length of twelve inches of uniform cross section; and the entrance point D may be provided on the side nearest the elevator with a barb or spur, as shown in Fig. 6. As the cutter descends, it is buried in the dirt at the bottom of the trench, and when it is extracted or raised by the power mechanism, this long cutter blade of uniform cross section and the barb on the entrance point serve to pull up or extract the dirt which may drop out of the cutter or be carried by said cutter to the top of the trench and forced out of the blade by the dirt on the succeeding down stroke. The weighted shank of the cutter is beveled at its lower end on the side adjacent to the elevator, and the beveled and the cutting blade is so arranged that the cutter will glance off should it strike the elevator or one of its buckets; thus the cutter is not liable to injure any part of the elevator or interfere with its work.

I attach importance to the peculiar long cutting blade of the uniform cross sectional form herein shown and described, to the use of the entrance point therewith, and the arrangement of the cutter blade and point obliquely to the line of the weighted shank, as I am enabled by such construction not only to slice off the soil but also cut the slice from the top surface to the bottom line of the trench so that it can be readily taken up by the buckets on the elevator. One of the great difficulties encountered in the successful digging of a trench by a power machine resides in the fact that the cutting mechanism fails to loosen and dig the earth at the bottom line of the trench, hence the bottom of the trench adjacent to the vertical face at the landside is liable to become rounded and to be compacted or made more solid by the repeated strokes or blows of the cutter; but by the employment of a cutting mechanism such as herein shown and described I am enabled to cut the earth off in slices clear to the bottom line of the trench and to extract the earth at the lowermost point owing to the fact that there is sufficient friction between the cutting blade and the earth to dig up the latter when the cutter is pulled out of the earth by the power mechanism.

The weighted gravity cutter is suspended and raised by means of the hoisting cable G which is attached to the shank by means of the clamp or the eye bolt $g'$; and this cable passes over a pulley or sheave G' and thence extends down to the hoisting drum H, (see Figs. 1 and 15) which has its shaft journaled in suitable bearings on a wheeled carriage I similar in form to an ordinary truck or wagon, said hoisting drum being adapted to be operated by means of an engine J mounted on the carriage I and connected with the drum in any suitable manner common in the art. This wheeled carriage I is provided with the upper inclined frame I' which extends in rear of the carriage so as to overhang the front part of the trench, and in suitable bearings attached to the side pieces of this upper inclined frame I' are journaled two screw threaded horizontal shafts K, L. These shafts are arranged transversely across the frame, at suitable intervals from each other, and they provide the means whereby the cutting mechanism and the connected elevator and carrier are adapted to be moved laterally across the frame of the wheeled carriage. The screw threaded shaft L receives an internally threaded nut or bearing M which is rigidly attached to the guide N for the gravity cutting mechanism. This guide is provided with a box $n$ which is fitted around a transverse beam $n'$ fixed to the side pieces I' to enable the box $n$ to slide or ride on the beam $n'$; and to the lower part of said guide-box is fastened the flat base $n^2$ in one end of which the cutter shank plays or moves freely. The nut or bearing M is rigidly fastened to this vertical box $n$ and in the flat base $n^2$ of the guide is formed an opening $o$ which is of sufficient diameter for the shank of the cutter to play freely therein. By having the hole $o$ in the guide of greater diameter than that of the cutter shank, the latter can be easily adjusted within certain limits and turned or twisted on its axis by the attendant; and the suspended cutter shank is held in position by the guide while it is being manipulated manually. This suspended guide remains normally at rest in order to hold or direct the position of the gravity cutter when it is in operation; but when the ground on which rests the wheeled carriage slopes in either direction from the line of the trench and the screw shaft L is thereby inclined, it is important that the guide be adjusted laterally of the machine to a position over the line of the trench so that the guide will direct the cutting mechanism in a vertical line. One end of this shaft extends beyond its bearing and carries a chain wheel $l$ over which passes a chain $l'$ that depends within convenient reach of the operator who is thus enabled to easily guide the shaft L and adjust the guide back and forth across the machine. To this guide is connected the pulley or sheave G' over which passes the hoisting cable G of the cutter mechanism, and the cable is thus caused to occupy at all times the same relative position to the cutting mechanism.

In the present elevator, I employ an improved form of bucket represented in Fig. 17 of the drawings, and which is adapted to discharge the soil to better advantage on the carrier belt, of loading itself quickly, of handling larger lumps of dirt, and the back of which acts as a chute for the material discharged by the following bucket of the elevator. The bucket is constructed with open sides or ends, and formed of a single piece of sheet metal, which is doubled upon itself at one end and riveted together at the other end, the bent bucket being angular in form. The lapped parts of the sheet metal are held apart by distance blocks $p^2$ fitted between the parts at the bucket, at the bend and united end thereof, and these blocks serve as a truss and to keep the bucket in proper shape. This construction provides a very strong light bucket, which is exceedingly useful in sticky soils as its open ends enable it to load very quickly, even with large lumps, and to discharge more freely than the common form of bucket.

The elevator P consists of an endless chain $p$ and a series of buckets $p'$ attached thereto. The elevator chain passes over two pulleys, $q, q'$, supported on suitable shafts at the top and bottom respectively of the vertical frame, the latter being substantially the same in construction as the elevator frame disclosed in my Patent No. 482,260, dated September 6, 1892. This elevator frame consists of telescopic members Q' adapted to be extended or contracted longitudinally with respect to each other to accommodate the elevator to trenches of maximum and minimum depth; and these extensible sections are rigidly held together by means of clamp screws, in the manner shown and described in my Patent No. 482,260, hereinbefore referred to. The elevator is arranged in an approximately vertical position, but it is so suspended that it can be changed to an inclined position and thus adapt the same to receive the loosened dirt cut from the face of the trench by the cutting mechanism. To better enable the elevator buckets to cut out the bottom of the trench when called on to do so, each bucket is provided on its front side, at the upper edge thereof, with teeth Q'' (two or more) which are approximately one tenth the width of the buckets; and these teeth on each bucket are arranged out of the vertical line of the teeth on the adjacent buckets, both above and below the same, whereby the teeth on each bucket are made to take their share of the dirt as the elevator travels around the idler roller $q'$ at the lower end of the elevator frame.

The material carried up by the elevator is deposited, as the buckets pass over the upper drum or roller $q$, upon a horizontal carrier belt R which extends in a line substantially at right angles to the line of the elevator; and to secure the best results in practical operation of the machine, the upper end of the elevator and the inner end of the horizontal carrier belt are supported on a common frame and arranged in practically fixed relation to each other.

I will now proceed to describe the means by which the elevator and horizontal carrier are suspended and operated, which ends are attained by novel devices so that the parts maintain their proper relative positions and at the same time the weight of these mechanisms is so distributed at the rear part of the wheeled carriage that the earth adjacent to the mouth of the trench is not liable to cave in owing to the load of the wheeled carriage.

S designates a longitudinal suspension cable which is of such length that it extends a long distance in front or on both sides of the carriage, said suspension cable being approximately one thousand feet (more or less) in length and having its ends anchored to "deadmen" $s, s$, firmly sunk in the ground in front and rear of the apparatus. This cable is raised or elevated at the apparatus above the same, and it rests in a saddle T, presently described, which is sustained at the upper rear end of the inclined frame I' on said wheeled carriage. The saddle is preferably curved longitudinally and provided with side flanges to retain the suspension cable therein, as shown in Fig. 10, and the saddle is integral or rigid with an internally threaded bearing U that receives the threads of the transverse adjusting shaft K by which said bearing may be moved laterally across the frame I' of the machine, one end of said shaft K being provided with a chain wheel $k$ having a depending chain $k'$ within convenient reach of the attendant. This bearing U is provided with depending straps 5, 6, which straddle or fit on opposite sides of a riding beam 7 which is firmly secured at its ends to the side pieces of the inclined upper frame I'; and these straps sustain a pendent differential sheave or block, 8, and a friction roller 9. This differential block 9 is provided with the usual cable or chain by which the suspended frame, elevator and inner end of the carrier can be raised or lowered. The roller 9 is journaled between the straps 5, 6, above the transverse riding beam 7 and it is adapted to bear or ride on the top edge of said beam which is thus made to sustain the weight of the elevator and a part of the weight of the carrier frame and to steady the bearing U so that the latter will move freely when the shaft K is turned.

From the block or sheave 8 depends a chain or cable 10 having its lower end attached by a swivel and hook 11 to a yoke 12; and the lower ends of this yoke are attached by eye bolts 13 to a horizontal supporting beam 14 to which is bolted the frame 15 of the engine for operating the vertical elevator and horizontal carrier. This supporting beam 14 is preferably made of a single piece of angle iron, as shown in Figs. 3 and 4, and the eye bolts 13 are attached to the horizontal flange of said beam, see Fig. 3. The frame 15 of the engine for rotating the driving pulleys of the elevator and carrier is shown more clearly in Fig. 4 of the drawings, and it is provided with the inclined arms 16 and the depending arms 17. The arms 16 are provided with bearings 16′ in which is journaled the shaft of the driving roller for the horizontal carrier, and the depending arms 17 are likewise provided with bearings for the shaft of the driving roller $q$ of the elevator.

The engine for operating the driving rollers of the carrier and elevator preferably consists of the two cylinders 18, 19, rigidly attached to the frame 15, and each provided with the valve chest in which operates the valve (not shown) and the valve rods. The piston rods 22 of the cylinders are connected to the cranks of the crank shaft 23, and the valve rods are operated by eccentrics on the crank shaft as is usual, one end of the shaft 23 having a balance wheel 24. The crank shaft is provided with two sprocket wheels 25, 25′, around which pass the sprocket chains 26, 27, and one of these chains 26 passes around a sprocket wheel on the shaft of the driving roller $q$ of the elevator while the other sprocket chain 27 passes around a similar sprocket wheel on the driving roller $r$ of the horizontal carrier belt R, whereby the elevator and carrier are driven from a common engine which is supplied with live steam from the boiler on the wheeled carriage I by means of a flexible hose (not shown).

The carrier belt R shown in detail by Figs. 11 to 13 inclusive consists of an endless pliable web R′, of rubber, leather, or equivalent material, and provided at its side edges with the driving chains $r'$, rigidly fastened to the same in any suitable way; said driving chains 28 engaging with sprocket wheels 29 attached to the driving roller $r$ which is driven by the engine on the suspended frame, and these chains also engage with sprocket wheels on the idler rollers hereinafter referred to. The inner end of the endless pliable belt is sustained in fixed relation to and below the elevator by means of the driving roller $r$, but the body of said carrier belt is sustained by the series of idler rollers 30, 31, 32, 33, 34 and 35 which are all suspended from the suspension cable S by means of the yokes 36. The yokes of the rollers 30, 31, 33, 34, and 35, are shown by the detail view Fig. 11 of the drawings, which yoke consists simply of a strap or piece of metal bent with the parallel ends and converging sides; and in the ends is loosely journaled the trunnions or shaft of the roller, each of the rollers having an attached bracket 38 provided with a friction roller 39 that rides on the top of the suspension cable S to suspend the yokes, the friction rollers and the carrier belt from said cable S. The bracket of the roller 32 is sufficiently long to receive and sustain another guide roller 40 below said roller 32, and over this guide passes the return side of the belt as it travels back from the rear roller 35 of the series to the front driving roller $r$. The rollers 32 and 35, are provided with loose sprocket wheels 41 with which engage the links of the drive chains attached to the side edges of the belt in a similar manner to the sprocket wheels on the drive roller $q$, but the belt runs freely over all the other rollers which merely serve to sustain the belt in position. The yokes of all the rollers except the rear delivery roller 35 are connected together in order to keep them properly spaced apart and hold them parallel with the driving roller of the belt by distance rods 42, 43, arranged on both sides of the yokes and connected to their lower free ends, and by means of a rope or cable fastened to the engine yoke 12 at the center; thence back from yoke to yoke at the apexes thereof. The rollers 30, 31, adjacent to the driving roller $q$ and the upper end of the elevator may be adjusted vertically to keep the belt at the proper height relative to the discharge of the elevator when the latter is raised by the differential block and chain 8, attached thereto, for a distance of five or six feet at such times as the change in depth is not sufficient to require a change in length of the elevator. This adjustment of the suspended rollers 30, 31, is effected by the block and tackle 44 arranged between the yokes of said rollers and the brackets by which they are suspended from the suspension cable S, and these ropes can be easily manipulated by the attendant whenever the elevator is raised or lowered.

The machine is moved forward gradually as the work of excavating progresses and the belt is kept taut or under proper tension by means of the hauling cable V and the power mechanism W which is mounted on the wheeled carriage to be operated from the vertical engine thereon, the hauling cable being so connected to the rear end of the loosely suspended carrier belt that it exerts a central longitudinal strain on the same which keeps the pliable endless web taut and in proper condition for operation.

The power mechanism is shown in detail in Fig. 15 and comprises a worm shaft 45 journaled in suitable bearings on the frame of the wheeled carriage, below the hoisting drum H, and provided at one end with a sprocket wheel 46 over which runs the sprocket chain 47 that is driven by a similar sprocket on one section of a hub friction clutch 49 carried by the shaft of the hoisting drum and which clutch can be operated by the engineer to turn the worm shaft or allow it to remain at rest. The worm on this shaft 45 meshes directly with a worm gear 50 that is carried by a vertical shaft 51, and to this shaft 51, is fastened a horizontal drum or wheel 52 around which the hauling cable is coiled. One end of this hauling cable is attached to the tongue of the wheeled vehicle, from thence the cable passes around a sheave 53 attached to the forward part of the suspension cable S, thence the cable passes around the friction drum 52, thence said cable passes up over a guide sheave 54, thence back along the suspension cable to another sheave 55 attached to the suspension cable but at its rear part and thence said cable V is attached by means of the block and tackle 56 to a block 56ª at the apex of a V shaped rope 57 which is attached to the ends of the roller shaft 35. By attaching the hauling cable to the freely suspended rear delivery roller in the central line of the belt, the strain or pull of the hauling cable is equal on both sides of the belt; and as the machine is moved forward by the power mechanism the rear end of the cable attached to the carrier belt pays out or is lengthened in proportion to the length of the cable taken up by the friction drum and the front end of the cable is shortened, thereby keeping a uniform pull or strain on the carrier belt.

It is important to maintain the engine on the suspended frame in proper relation to the line of carrier belt extending back from the elevator, to provide for the adjustment of the carrier belt by the attendant standing at the mouth of the trench, and to steady the suspended frame and the whole elevator. To accomplish these ends I provide the extensible rods 58, 58, which are attached to eyes 59 on the frame of the wheel carriage and to the angle supporting beam 14; and each of these rods is made in two sections connected by the turn buckle 60 which provides convenient means for the lengthening or shortening of the rods or stays 58 and which can be adjusted to hold the suspended frame and engine thereon in proper relation to the carrier belt and to maintain the latter in a position substantially at right angles to the elevator.

The elevator frame is held in position by means of a sleeve or collar 61 which fits around the elevator ladder or frame at a point below the suspended frame 15, and this collar or sleeve is pivoted to turn freely on a bolt 62 attached to a band 63 fitted on a shaft or bar 64 to which it may be rigidly fastened by a set screw. This shaft or bar 64 is adapted to be set across the trench and it is journaled or mounted in the lower ends of the inclined supports 65, the upper ends of which are pivotally attached to the side pieces of the frame of the wheeled carriage. These hinged pieces are adapted to rest on the ground and to slide thereon as the apparatus is moved forward; and the shaft 64 and hinged side pieces are kept in proper relation by means of a long through bolt 66 which passes through the shaft and washers fitted against the hinged pieces.

The elevator is free to swing in any desired position around the guide 61 to enable it to be placed properly for taking up the dirt, and this guide can be moved laterally on the shaft or bar 64, to any point between the timbers of the frame, in which position it can be clamped by the set screw, thus affording a rigid guide or stay for the elevator frame and which is capable of adjustment to suit the position of the elevator frame.

The operation of my invention is as follows:—After the suspension and hauling cables have been properly adjusted, and the digger, elevator and carrier rigged as shown in Fig. 1, steam is admitted through the hose to operate the suspended engine and the elevator and carrier are thereby continuously driven. Two men are employed, one to control the engine on the wheeled carriage which operates to lift the cutting mechanism and operate the friction clutch that throws the friction drum in and out of gear to cause the apparatus to move forward as the work progresses, and the other attendant to adjust and place the cutter in position to work to the best advantage. The operator on the ground grasps the loosely suspended and guided cutter-shank, places the cutter-blade in proper position, and the engineer releases the hoisting drum and allows the cutter to drop or fall by gravity, after which the cutter is raised by the hoisting mechanism and, as it has been found that a speed of ten to fourteen strokes or cuts per minute can easily be attained, the operation of cutting is repeated. On the next down stroke, the cutter is placed to one side of the preceding cut and twisted or turned so that the concave side of the blade faces the open line of the trench. As the cutter descends, it pares or slices off the dirt which falls to the bottom of the trench around the lower part of the elevator, and said cutter operates on the dirt clear to the bottom of the trench, also serving to extract the earth at the bottom as it is withdrawn or lifted owing to the friction between the earth and the cutter-blade. The dirt is taken up by the buckets of the elevator, and the latter deposits such earth upon the horizontal carrier belt which conveys the earth back to the trench to fill the same after the pipes or conduits are laid therein. As the digging progresses, the apparatus is moved forward by throwing the friction clutch into gear with the hoisting drum shaft and rotating the friction drum to draw upon the hauling cable, the rear end of which draws upon the carrier belt to keep it taut and rear end of the hauling cable pays out as the front end is coiled around the friction drum. If the ground slopes in either direction away from the line of the trench, as is frequently the case, and the machine is canted or tilted out of the horizontal position, it is necessary to shift the cutting mechanism, the elevator and the carrier laterally on the machine in order to have the elevator in a vertical plumb line and bring the cutter in position so it will cut straight to the bottom of the trench, and leave parallel sides thereto, and this lateral adjustment is effected by rotation of the screw shafts K, L, to adjust the nuts thereon and the devices suspended from the nuts, such adjustment of the cutter guide and the suspended frame for the elevator and carrier being effected independently of each other. The elevator can be swung or moved to any desired position to properly take up the dirt at the bottom of the trench, and as the carrier is suspended from the suspension cable S which bears in the saddle T on the laterally adjustable support for the suspended frame that sustains the elevator and carrier, the latter is held in a position substantially at right angles to the elevator. The engineer standing on the wheeled carriage is in a position where he can readily ascertain by glancing down the carrier whether the latter is in proper line with the elevator, and if it should be found that the carrier belt is running to one side or the other of the suspended rollers, the attendant on the ground has only to manipulate the turn buckles on the extensible stay rods in order to bring the carrier in proper position. The engineer standing at the rear end of the carriage is also in a position where he can glance down into the trench and observe the position of the elevator and when it is necessary to throw the friction clutch with gear and move the apparatus forward to bring the elevator in proper position. In order to keep the driving roller q of the carrier free from dirt which is liable to drop or fall on the lower or return side of the belt, I provide a scraper and pan 66 which is arranged close to the driving roller q, between the upper and lower sides of the belt, and is supported by arms 67 attached to the suspended frame that sustains the elevator, the carrier and the motor therefor. The dirt that accumulates in the pan can be readily removed by the attendant standing on the ground at the mouth of the trench.

The suspension cable lies on the ground except for the distance where it is raised to rest in the saddle of the apparatus about two hundred (200) feet of the cable being lifted, and thus the main part of the cable is practically out of the way of traffic, as shown in Fig. 19.

I am aware that changes in the form and proportion of parts and details of construction of the devices herein shown and described as an embodiment of my invention can be made without departing from the spirit or sacrificing the advantages thereof, and I therefore reserve the right to make such changes as fairly fall within the scope of my invention.

Having thus fully described my invention, what I claim as new, and desire to secure by Letters Patent, is—

1. In a machine for excavating trenches, a manually-adjustable weighted cutter having its cutting edge substantially in line with its body, combined with a power lifting mechanism from which said weighted cutter is suspended, whereby said cutter can be adjusted axially and placed to any desired position with a certain radius at the mouth of the trench and is adapted when it descends to cut the earth by gravity from the top to bottom at the landside of the trench, and an elevator mechanism arranged relatively to the cutter mechanism to carry away the dirt lodged at the bottom of the trench, substantially as and for the purpose set forth.

2. In a machine for excavating trenches, a manually-adjustable weighted cutter having its blade arranged substantially in line with the weighted body, combined with a power lifting mechanism having its cable connected to said weighted body of the cutter, and a guide in which the cutter-body plays freely, whereby said cutter can be turned axially and placed at any desired position within a certain radius at the mouth of the trench, for the purpose described, substantially as set forth.

3. In a machine for excavating trenches, a manually-adjustable weighted cutter provided with a blade substantially in line with its body, combined with a power lifting mechanism for raising the weighted cutter after each stroke thereof, and a guide in which the cutter body plays freely and which permits the cutter to be adjusted bodily both on its axis and within a certain radius at the mouth of the trench, whereby the cutter can be accurately placed to any desired position previous to its stroke and is adapted to cut the earth by gravity from the landside of the trench, substantially as set forth.

4. In a machine for excavating trenches, a manually-adjustable gravity cutter mechanism substantially such as herein described, combined with a power lifting mechanism having its cable connected to the cutter mechanism, and a guide in which a part of the cutter mechanism plays freely, as and for the purpose described.

5. In a machine for excavating trenches, a gravity cutting mechanism having a weighted shank and the cutter substantially in line with said shank, combined with a lifting mechanism and guide devices substantially as described which admit of the cutters being manually twisted or turned previous to each stroke at the discretion of the attendant, substantially as and for the purpose described.

6. In a machine for excavating trenches, the gravity cutter mechanism comprising the weighted vertical hand-shank made of uniform cross section and of sufficient length to enable the operator to easily grasp and turn the cutter, and the fixed blade at the lower end of the shank; combined with a power lifting mechanism, and a guide in which the shank is free to move both longitudinally and axially, as and for the purpose described.

7. In a machine for excavating trenches, the gravity cutting mechanism adapted to pare off the earth in slices from the landside of a trench and comprising the weighted shank, and the blade rigid therewith, said blade being of uniform concavo-convex form in cross-section and substantially uniform in thickness throughout its depth to permit the earth at the bottom of the cut to be compacted therein and to extract the earth from the bottom of the trench when said cutter is lifted, as and for the purpose set forth.

8. In a machine for excavating trenches, the gravity cutting mechanism adapted for paring the earth in slices from the landside of a trench and comprising a weighted shank and a concavo-convex blade of uniform cross-section secured obliquely to the lower end of the weighted shank, substantially as and for the purpose described.

9. In a machine for excavating trenches, the cutter provided with a thin blade of uniform cross-section substantially uniform in thickness throughout its depth, and of such length for the earth to be compacted therein when the cutter completes its descent whereby the blade is adapted to slice or pare off the earth from the landside of the trench during the descent of the cutter and when it is lifted to extract the freshly cut earth from the bottom of the trench, as set forth.

10. In a machine for excavating trenches, the cutting mechanism comprising a weighted shank, a blade rigid therewith, and an entrance point depending below the blade, as and for the purpose described.

11. In a machine for excavating trenches, the cutter comprising a weighted shank of uniform cross section to adapt the operator to readily grasp and manipulate the same, a blade rigid with the lower end of said shank, and a rigid entrance point depending centrally from said blade, as and for the purpose described.

12. In a machine for excavating trenches, the gravity cutter comprising a longitudinal weighted shank, and a cutter blade arranged obliquely with relation to the line of the shank, as and for the purpose described.

13. In a machine for excavating trenches, the gravity cutter having an oblique blade at its lower end, combined with a power lifting mechanism, and intermediate connections between said lifting mechanism and the gravity cutter, as and for the purpose described.

14. In a machine for excavating trenches, the gravity cutter comprising a long weighted shank of uniform cross section and an oblique cutter at the lower end thereof, combined with a power lifting mechanism, and a cable between such lifting mechanism and the gravity cutter, as and for the purpose described.

15. In a machine for excavating trenches, the gravity cutting mechanism comprising a weighted shank, a blade of concavo-convex cross sectional form rigidly united thereto, and an entrance point depending below the blade and rigidly attached to the solid shank, as and for the purpose described.

16. In a machine for excavating trenches, the gravity cutting mechanism, comprising a weighted shank, a concavo-convex blade, and an entrance point, said blade and point being rigidly united obliquely to the shank by a solid bent bar which is united rigidly to the shank, as and for the purpose described.

17. The combination with a wheeled carriage, of the power lifting mechanism thereon, a gravity cutter having a weighted shank of uniform cross section and a blade fixed to the shank substantially in line therewith, and a stationary guide on said carriage, the suspended cutter shank playing freely in said guide and adapted to be manually adjusted therein to any desired direction at each stroke, as and for the purpose described.

18. The combination with a wheeled carriage, and the lifting mechanism thereon, of a gravity cutter having the weighted shank of uniform cross section, and a guide adjustable laterally across the machine and adapted to loosely receive the cutter shank, as and for the purpose described.

19. In a machine for excavating trenches, the combination with a wheeled carriage, and the lifting mechanism thereon, of the gravity cutter, the laterally adjustable guide having a nut and the depending sheave or block, the threaded shaft working in said nut, and the lifting cable passing through the sheave or block of the guide and connected to the cutter and the lifting mechanism, substantially as described.

20. In a machine for excavating trenches, the combination with a cutting mechanism, of an elevator, a horizontal carrier having its inner end sustained in fixed relation to the delivery end of the elevator, a suspended frame on which the contiguous ends of the elevator and carrier are supported, and means for operating the elevator and carrier, substantially as described.

21. In a machine for excavating trenches, the combination with a cutting mechanism, of an elevator, a horizontal carrier, a suspended frame by which the adjacent ends of said elevator and carrier are sustained in fixed relation to each other, and a motor common to both the elevator and carrier and supported by said suspended frame, as and for the purpose described.

22. In a machine for excavating trenches, the combination with a cutting mechanism, of a suspended frame carrying a suitable motor or engine, an elevator having its driving shaft supported on the suspended frame and driven by said motor or engine, and a horizontal suspended carrier having its driving shaft supported by said suspended frame and adapted to be driven by the motor or engine, as and for the purpose described.

23. In a machine for excavating trenches, the combination with a cutting mechanism, of a suspended carrying frame, a motor or engine, an elevator depending from said suspended frame and having its driving roller geared to the shaft of said engine, and a suspended carrier with its driving roller journaled in fixed bearings on the suspended frame and geared to the shaft of the engine, whereby the latter is adapted to propel the carrier and the elevator, substantially as described.

24. In a machine for excavating trenches, the combination with a wheeled carriage, and a suspended gravity cutter, of a longitudinal suspension cable extending over the carriage and anchored in front and rear of the same, an elevator sustained by a suspended frame, and a horizontal carrier suspended from said cable and having its inner end sustained in fixed relation to the elevator by the suspended frame, as and for the purpose described.

25. In a machine for excavating trenches, the combination with a carriage and a cutting mechanism, of a longitudinal suspension cable anchored in front and rear of the carriage, a suspended frame, an elevator, a horizontal carrier suspended from the cable and having its driving roller supported in fixed relation to the elevator by the suspended frame, and a motor on said frame adapted to propel the roller of the carrier and the elevator, as and for the purpose described.

26. In a machine for excavating trenches, the combination with a carriage, a cutting mechanism, and an elevator, of the suspended frame carrying the motor or engine, a longitudinal suspension cable anchored in front and rear of the carriage, and a horizontal carrier having its supporting rollers provided with yokes suspended from said cable, as and for the purpose described.

27. In a machine for excavating trenches, the combination with a suspension cable, and a suspended frame, of the longitudinal carrier belt, the driving roller journaled in said suspended frame and geared to the drive chains of the carrier belt, the yokes having the friction rollers which ride on the suspension cable, and the idler rollers journaled in said yokes, the end roller and the return idler roller being provided with the sprocket wheels which engage with the chains of the carrier belt, as and for the purpose described.

28. In combination with a suspension cable and a suspended frame, the horizontal carrier belt provided with the drive chains, the driving roller journaled in the suspended frame and having sprocket wheels which engage with the drive chains, and the series of yokes suspended from the cable and each having a supporting idler roller which sustains the carrier-belt, the end idler roller and the returning idler roller being provided with sprocket wheels which mesh with the chains of the carrier belt and one of the yokes having a roller below the top roller which sustains the intermediate part of the return side of the carrier belt, as and for the purpose described.

29. In combination with a suspension cable and a suspended frame carrying a motor and an elevator, of a carrier belt having its driving shaft journaled on said suspended frame and geared to the engine, and a series of yokes suspended from the cable and carrying rollers which sustain the carrier belt, the yokes and roller adjacent to the suspended frame being vertically adjustable, as and for the purpose described.

30. In a machine for excavating trenches, the combination with a wheeled carriage, a digging mechanism, and an elevator, of a horizontal suspended carrier, a hauling cable connected to said carriage and to the rear end of said carrier, and power mechanism of said carriage, and connected to the hauling cable, as and for the purpose described.

31. In combination with a suspension cable, the carrier belt, the series of connected yokes suspended from the cable and having the idler rollers over which the belt runs, the loosely suspended yoke and roller at the rear end of the series of connected yokes, and a tension device connected to said freely suspended rear roller, substantially as described.

32. In combination with a suspension cable, the endless carrier belt, the driving roller therefor, the series of suspended yokes carrying the rollers which sustain the carrier belt, the distance pieces connected to all the yokes of the series except the yoke at the rear end of the carrier, and a tension device connected to said rear roller, substantially as described.

33. In a machine for excavating trenches, the combination with a wheeled carriage, a digging mechanism, and an elevator, of a horizontal carrier extending rearward from the elevator, a longitudinal suspension cable from which the carrier is suspended, and a hauling cable passing through blocks or sheaves on the suspension cable and connected to the carriage and the rear part of said horizontal carrier, substantially as and for the purpose described.

34. In a machine for excavating trenches, the combination with a carriage, a cutting mechanism, and an elevator, of a fixed suspension cable, a horizontal carrier suspended from said cable, a hauling cable connected to the carriage and having its other end fastened to the rear end of the carrier in line with its longitudinal axis, and a friction drum mounted on the carriage to be driven by the engine thereon and having the hauling cable coiled thereon, substantially as described.

35. In a machine for excavating trenches, the combination with a carriage, a cutting mechanism, and an elevator, of a fixed suspension cable, a horizontal carrier suspended from said fixed cable, a hauling cable connected to the carriage and to the rear end of the carrier; and power mechanism on the carriage comprising a friction drum around which the hauling cable is coiled, and a worm shaft geared to the friction-drum-shaft and adapted to be driven by an engine and to be controlled by a suitable clutch whereby an intermittent controlled feed may be given to the whole apparatus, substantially as described.

36. In a machine for excavating trenches, the combination with a carriage and a cutting mechanism, of a suspended frame carrying the engine or motor, an elevator depending from the suspended frame and driven by the motor thereon, a suspended carrier having its inner end supported by the suspended frame, and means for adjusting the suspended frame laterally on the frame of the carriage, as and for the purpose described.

37. In a machine for excavating trenches, the combination with a carriage, and a cutting mechanism, of a suspended frame carrying a motor or engine, the elevator and a suspended horizontal carrier supported at their adjacent ends by said suspended frame, the laterally adjustable support from which said frame is suspended, and a shaft working in a nut on said laterally adjustable support, as and for the purpose described.

38. In a machine for excavating trenches, the combination of a carriage having the transverse riding beam fixed at its upper rear part, a suspended frame carrying a motor and sustaining the adjacent ends of an elevator and horizontal carrier, a laterally adjustable support fitted to ride on the riding beam and provided with a fixed nut, a screw shaft journaled in the fixed frame on the carriage and fitted in the nut of said support, and means connecting the suspended frame with said support, as and for the purpose described.

39. In a machine for excavating trenches, the combination of a wheeled carriage, a suspended frame carrying a motor or engine, an elevator supported by said suspended frame, a suspended horizontal carrier having its inner end sustained by said frame in fixed relation to the elevator, and means intermediate of the suspended frame and the carriage for adjusting and holding the suspended frame at right angles with the line of the belt extending rearward, substantially as described.

40. In a machine for excavating trenches, the combination of a wheeled carriage, a suspended frame carrying a motor or engine, an elevator, a suspended horizontal carrier having its inner end sustained by the suspended frame in fixed relation to the elevator, and the extensible stay rods connected to the carriage frame and the suspended frame, substantially as described.

41. In a machine for excavating trenches, the combination with a carriage and a suspended elevator-frame, of the hinged pieces connected to the carriage and having a transverse bar connected to the same at or near the free ends thereof, and the pivoted sleeve fitted freely on the elevator frame and adjustably connected to said transverse bar of the hinged pieces, substantially as described.

In testimony whereof I affix my signature in presence of two witnesses.

ARTHUR JOHN MASON.

Witnesses:
E. K. DYAR,
H. M. DYAR.